(12) United States Patent
Said et al.

(10) Patent No.: US 9,824,622 B1
(45) Date of Patent: Nov. 21, 2017

(54) DETERMINING A GEOMETRIC POSITION OF A DISPLAY SCREEN WITHIN AN ARRAY OF COUPLED DISPLAY SCREENS

(75) Inventors: Amir Said, Cupertino, CA (US); Majid Fozunbal, Bayonne, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1122 days.

(21) Appl. No.: 13/018,276

(22) Filed: Jan. 31, 2011

(51) Int. Cl.
*G09G 5/00* (2006.01)
*G09G 3/20* (2006.01)

(52) U.S. Cl.
CPC ....... *G09G 3/2092* (2013.01); *G09G 2230/00* (2013.01); *G09G 2300/026* (2013.01); *G09G 2360/02* (2013.01)

(58) Field of Classification Search
CPC ................. G09G 5/00; G09G 2330/08; G09G 2330/012; G09G 2360/144; G09G 2360/145
USPC .................................................. 345/1.1–3.4
See application file for complete search history.

(56) References Cited

U.S. PATENT DOCUMENTS

| | | | | |
|---|---|---|---|---|
| 7,961,157 | B2 * | 6/2011 | Perkins et al. | 345/1.3 |
| 7,965,257 | B2 * | 6/2011 | Perkins et al. | 345/1.3 |
| 2007/0285385 | A1 * | 12/2007 | Albert et al. | 345/107 |
| 2008/0240585 | A1 * | 10/2008 | Imajo | 382/232 |
| 2009/0016622 | A1 * | 1/2009 | Itakura | 382/236 |
| 2012/0057646 | A1 * | 3/2012 | Jovicic et al. | 375/295 |

OTHER PUBLICATIONS

Elrod, S., et al., "Liveboard: a large interactive display supporting group meetings, presentations, and remote collaboration," Proc. Human Factors in Computing Systems (CHI). pp. 599-607. 1992.
Johanson, B., et al., "The interactive workspaces project: experiences with ubiquitous computing rooms," IEEE Pervasive Computing, vol. 1(2), pp. 67-74, 2002.
NI, T., et al., "A survey of large high-resolution display technologies, techniques, and applications," Proc. IEEE Virtual Reality, pp. 223-234, 2006.
Streitz, N.A., et al., "i-LAND: an interactive landscape for creativity and innovation," Proc. Human Factors in Computing Systems (CHI), pp. 120-127, 1999.
Yost, B., et al., "The perceptual scalability of visualization," IEEE Trans. Visualization Computer Graphics, vol. 12(5), Sep.-Oct. 2006.

* cited by examiner

*Primary Examiner* — William Boddie
*Assistant Examiner* — Leonid Shapiro
(74) *Attorney, Agent, or Firm* — HP Inc. Patent Department

(57) ABSTRACT

In a method for determining a position of at least one display screen within an array of coupled display screens an emitted signal from an adjacent display screen is detected. The detecting is performed by a sensor coupled with a side of a plurality of sides of a display screen. A positional code number is determined based on the detecting. The positional code number includes a bit number corresponding to a detection of the signal emitted from the adjacent display screen.

7 Claims, 8 Drawing Sheets

600

DETECTS A SIGNAL EMITTED FROM AN ADJACENT DISPLAY SCREEN, THE DETECTING PERFORMED BY A SENSOR COUPLED WITH A SIDE OF A PLURALITY OF SIDES OF A DISPLAY SCREEN, WHEREIN THE ADJACENT DISPLAY SCREEN IS ADJACENT TO THE SIDE
602

DETERMINES A POSITIONAL CODE NUMBER BASED ON THE DETECTING, THE POSITIONAL CODE NUMBER INDUCING A BIT NUMBER CORRESPONDING TO A DETECTION OF THE SIGNAL EMITTED FROM THE ADJACENT DISPLAY SCREEN
604

SENDS THE POSITIONAL CODE NUMBER TO A RECEIVER OF POSITIONAL CODES
606

RECEIVES A PLURALITY OF POSITIONAL CODES FROM AN ACTIVE CORNER DISPLAY SCREEN WITHIN AN ARRAY OF DISPLAY SCREENS, WHEREIN EACH POSITIONAL CODE OF THE PLURALITY OF POSITIONAL CODES INCLUDES A BIT NUMBER CORRESPONDING TO A DETECTION OF A SIGNAL EMITTED FROM AN ADJACENT DISPLAY SCREEN
702

BASED ON THE RECEIVING THE PLURALITY OF POSITIONAL CODES, DETERMINES A GEOMETRIC POSITION OF THE ACTIVE CORNER DISPLAY SCREEN WITHIN THE ARRAY OF DISPLAY SCREENS
704

FIG. 7

DETERMINING A GEOMETRIC POSITION OF A DISPLAY SCREEN WITHIN AN ARRAY OF COUPLED DISPLAY SCREENS

BACKGROUND

In work environments, large wall-mounted surfaces are being extensively used for exchanging information. In fact, a feature common to nearly every meeting room is the availability of a white board or a flip chart.

There are two main types of information shared in work environments, temporary and semi-permanent information. Temporary information consists of when text, figures and diagrams are drawn/written during technical discussions, brainstorm sessions, and other forms of meetings, with some duration. Semi-permanent information consists of when the same space is continuously used by one group and the surface contains information that changes slowly. For example, a space may list a series of tasks, their completion state, etc., which are changed as things happen.

DESCRIPTION OF THE DRAWINGS

FIG. 6 is a flow diagram of a method for determining a position of at least one display screen within an array of coupled display screens, according to one embodiment of the present technology.

FIG. 7 is a flow diagram of a method for determining a position of at least one display screen within an array of coupled display screens, according to one embodiment of the present technology.

Figure 1:
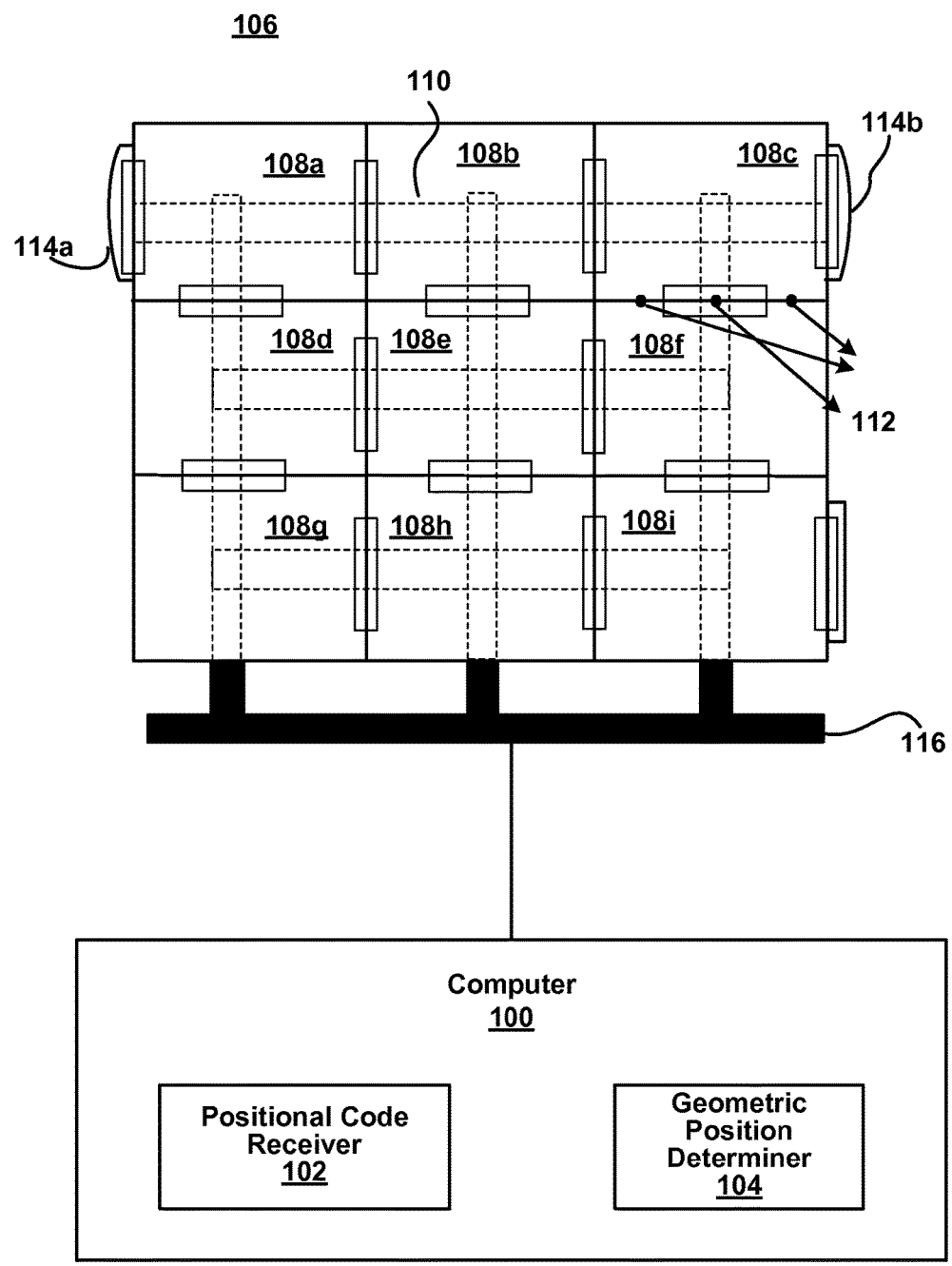
FIG. 1 is a block diagram of a system for determining a position of at least one display screen within an array of coupled display screens, according to one embodiment of the present technology.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "detecting", "determining", "sending", "receiving", "outputting", "accessing", "turning off", "repeating", "instructing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical computers.

The discussion will begin with a brief overview of the current use of projectors with display screens. The discussion will then focus on embodiments of the present technology that provide a system for determining a position of at least one display screen within an array of coupled display screens.

Overview

In general, the only systems that provide a single seamless display screen and surface are those made of multiple projectors, with tiled projected images. The main problem with using a projector or multiple projectors to display a single seamless screen and surface is that if the projector(s) are located in front of the collaboration surface, then the user's shadows overhang the projected images, making viewing of images difficult. In order to address the user shadow problem, a projector(s) may be mounted on the ceiling. However, a ceiling mounted projector(s) usually entails a custom, expensive installation, and very little flexibility for moving the collaboration surface, if needed.

Alternatively, locating a projector(s) behind the display surface wastes space, due to the minimum distance that is required between the projector(s) and the display screen. Furthermore, a projector(s) placed in a fixed position (e.g., ceiling) still requires complicated installation and wiring.

Moreover, a single display surface may eliminate image discontinuities, but it lacks the features of a multiple tile display screen, such as being able to change the display screen size, aspect ratio, and shape (e.g., curved, flat).

Currently, there are systems that include multiple display screens used as a large display screen. For example, multiple tiles for an LCD display screen may be used. However, this system is heavy and cumbersome. Even though the LCD display screen may be labeled as scalable by the manufacturer, it is not easy for customers to change the LCD display screen without professional help.

Embodiments of the present technology provide a system for visualization and collaboration, which includes an array of coupled display screens (otherwise known as "tiles") connected together via modular units. Some or all of the display screens may also function as touch display screens.

In brief, behind and on each side of the display screens are a number of connectors which may be used for power distribution and data input and/or output. In one embodiment, these connectors include a signal output and a signal detector. Ultimately, the signal output of one display screen is used to output a signal to be detected by an adjacent display screen's signal detector. The signal detector then determines a positional code of bit numbers that correspond with detected signals at all sides of the display screen. This positional code that is made up of bit numbers is then sent to a computer for processing. Based on the positional code, the computer determines the geometric position of the display screen within the array of coupled display screens. This process may be repeated until the geometric positioning of all of the display screens is known.

Significantly, in one embodiment, the computer 100 is a centralized computer coupled with the array of coupled display screens. In another embodiment, each display screen of the array of coupled display screens may have a computer, such as computer 100, embedded within. Thus, the plurality of computers embedded within the array of display screens may execute some or all of the tasks described herein. Further, the plurality of computers, having the proper communication protocol, may communicate with each other for sharing data and assigning tasks, thereby eliminating the need for a central computer.

Thus, embodiments of the present technology enable multiple display screens to be placed next to each other without any particular order and still function as a large display screen. The computer coupled with the tile-based system learns the location of each small display screen in the big screen and is able to render data appropriately. Thus, without human involvement, the geometric location of display screens may be automatically registered for appropriate rendering of data.

The following discussion will begin with a description of the structure of the components of the present technology. The discussion will then be followed by a description of the components in operation.

Structure

FIG. 1 is a block diagram of a system 106 for determining a position of at least one display screen within an array of coupled display screens 108*a*, 108*b*, 108*c*, 108*d*, 108*e*, 108*f*, 108*g*, 108*h*, 108*i* (hereinafter, "108"), according to one embodiment of the present technology. It should be appreciated that system 106 may include any number of a plurality of display screens. Further, it should be appreciated that instead of one computer 100 coupled with the array of coupled display screens 108, each of the array of coupled display screens 108 may have its own computer similar in features and functions as computer 100 described herein. FIG. 1 includes a tile-based system coupled with a computer 100. The computer includes a positional code receiver 102 and a geometric position determiner 104. The tile-based system produces a large surface for visualization and team collaboration (white-board) in which every component of the system is modular and interchangeable.

In one embodiment, the tile-based system (hereinafter, "array of coupled display screens") includes a plurality of display screens 108 coupled with each other. Each display screen of the plurality of display screens comprises a plurality of signal outputs and a plurality of signal detectors.

Figure 2:
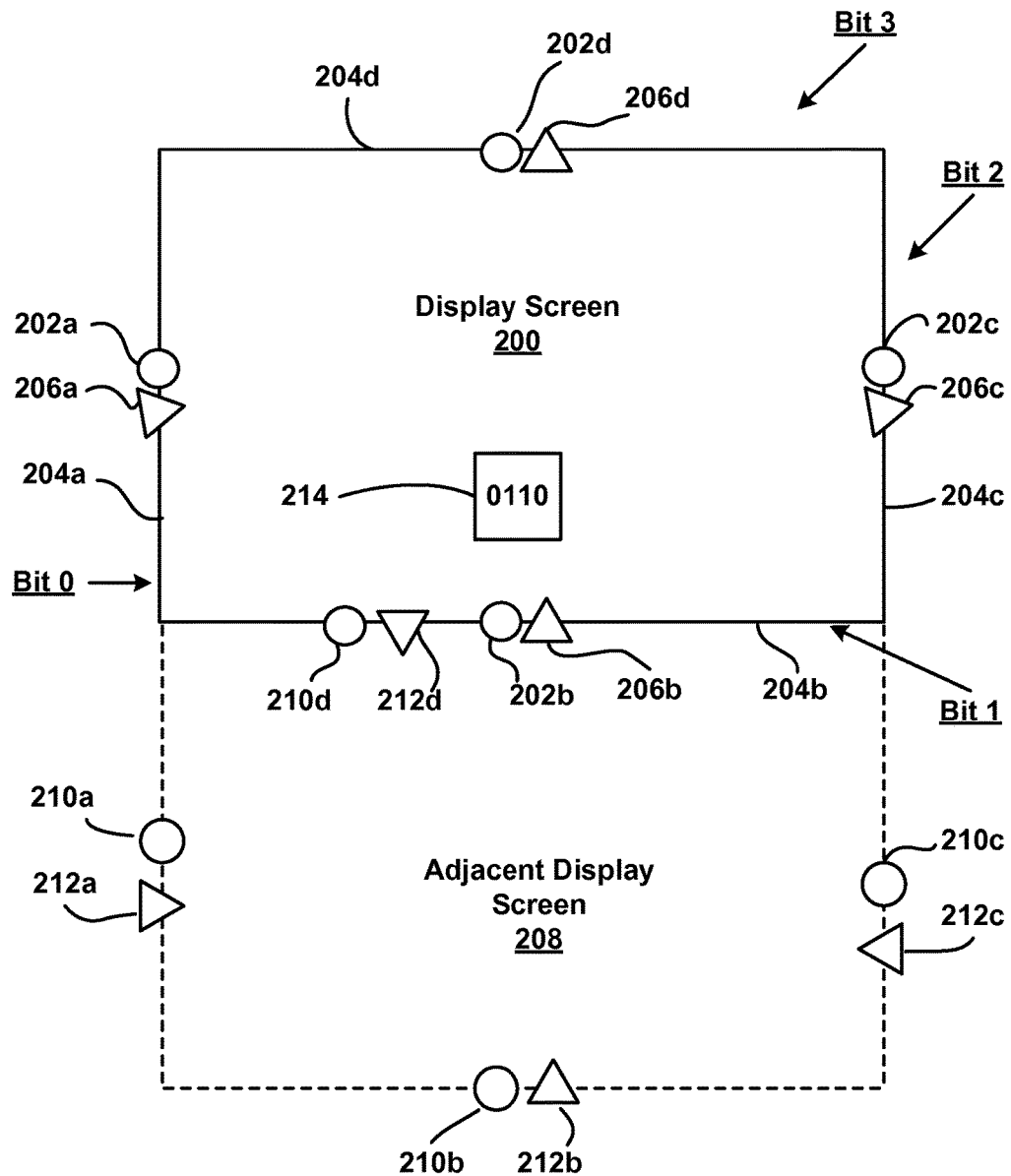
FIG. 2 is a block diagram of an example display screen, according to one embodiment of the present technology.

With reference to FIG. 2, a block diagram of an example display screen 200, according to one embodiment of the present technology, is shown. While FIG. 2 shows a display screen with four sides, it should be noted that a display screen may have more than four sides.

In one embodiment, the display screen 200 has signal outputs 202*a*, 202*b*, 202*c* and 202*d* (hereinafter, "202") (plurality of signal outputs) coupled with each side 204*a*, 204*b*, 204*d* and 204*d* (hereinafter, "204") of the display screen 200. In one embodiment, the signal may be optical.

In another embodiment, the signal may be electrical. The signal serves as a message. The signal detector is preprogrammed to receive the message sent by the signal output. For example, the signal output may be in the form of a light. In one embodiment, the light may be constant. In another embodiment, the light may flashing intermittently. It should be understood that the signal output may be any such output that is recognizable by a signal detector, wherein the signal detector is preprogrammed to receive such a signal.

Additionally, in one embodiment, the display screen 200 has signal detectors 206*a*, 206*b*, 206*d* and 206*e* (hereinafter, "206") (plurality of signal detectors) coupled with each side 204 of the display screen 200. In one embodiment and as shown in FIG. 2, each of the plurality of signal detectors 206 is coupled with a separate side 204 of the display screen 200.

FIG. 2 further shows an example adjacent display screen 208 that includes a plurality of signal outputs 210*a*, 210*b*, 210*c* and 210*d* (hereinafter, "210") and a plurality of signal detectors (212*a*, 212*b*, 212*c* and 212*d*) (hereinafter, "212"), according to an embodiment. Further, in one embodiment, each of the plurality of signal detectors 206 of the display screen 200 detects the separate signal emitted from each signal output of each adjacent display screen (display screen 208, for example) that is adjacent to each separate side (sides 204, for example). It should be appreciated that all sides 204 of the display screen 200, or just some of the sides 204 of the display screen 200, may have adjacent display screens.

In one embodiment, each of the plurality of signal detectors 206 determines a plurality of positional codes based on the detected signals. Further, each of the plurality of positional codes includes a bit number corresponding to a detection of each of the separate signals emitted from each adjacent display screen (such as adjacent display screen 208). It should be appreciated that each of the plurality of signal outputs and the plurality of signal detectors may be coupled with each other in various configurations, as part of a connector or separate from a connector. Further, the plurality of signal outputs and plurality of signal detectors or parts thereof may be communicating through wireless means or through cable means. Moreover, the plurality of signal outputs and plurality of signal detectors or parts thereof may be receiving power through means of a cable or through an onboard power system.

For example and with reference to FIG. 2, a plurality of signal outputs 202 and a plurality of signal detectors 206 are shown to be coupled with the display screen 200. In one embodiment, a signal output and a signal detector may be coupled with each other on a connector that is coupled with the display screen.

In one embodiment and still referring to FIG. 2, the number of bits that are part of the positional code equal the number of sides of the display screen. For example, the four sided display screen has four number bits. In one example, the positional code 214 for the display screen 200 is "0110". Bit number 0 is the far right bit. Bit number 1 is the second number from the far right. Bit number 2 is the third number from the far right. Bit number 3 is the fourth number from the far right. Additionally, in one embodiment, bit 0 is associated with side 204*a*, bit 1 is associated with side 204*b*, bit 2 is associated with side 204*c* and bit 4 is associated with side 204*d*. Thus, at any given time, the readings for the positional code of any display screen is a four bit number, such as 0000, 0001, . . . and 1111.

Thus, once the signal outputs 202 and 210 are turned on and each of the signal outputs 202 and 210 are emitting a signal, the signal detectors 206 and 212 may detect a signal, and translate this detection into a bit number, that makes up the positional code.

Figure 3:
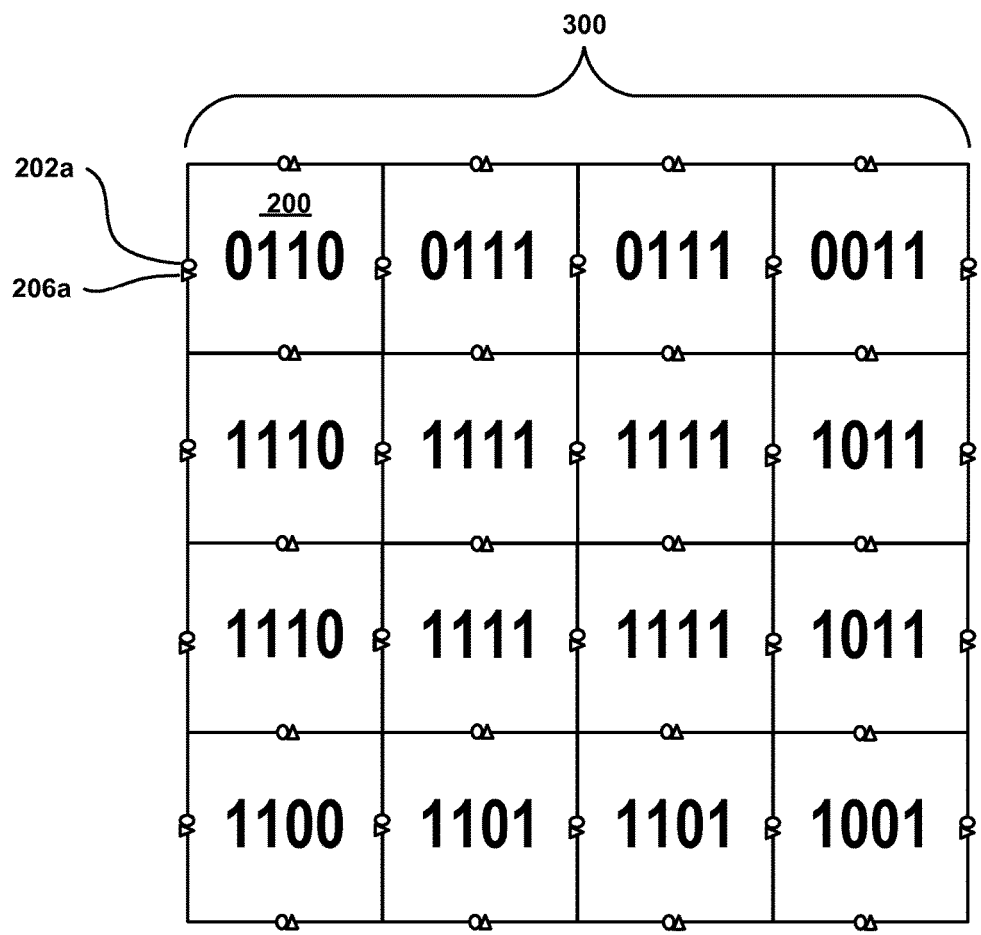
FIG. 3 is a block diagram of an example array of coupled display screens, according to one embodiment of the present technology.

More specifically and referring now to FIG. 3, a block diagram is shown of an example array of coupled display screens 300, according to one embodiment of the present technology. As can be seen, display screen 200 is shown within the array of coupled display screens 300. Signal outputs 202 and signal detectors 206 are coupled with the display screen 200. Of note, even though not labeled, there are also signal outputs and signal detectors coupled with the other sides of the display screen 200 and with each side of each of the other display screens shown. Each of the display screens shown in FIG. 3 has a positional code associated therewith. The positional codes of the display screens are the following, from left to right, top to bottom: 0110, 0111, 0111, 0011, 1110, 1111, 1111, 1011, 1110, 1111, 1111, 1011, 1100, 1101, 1101, 1001.

In one embodiment, the computer 100 sends an instruction to the signal outputs of the array of coupled display screens 300 to turn on its' signals. Each of the plurality of signal outputs then turn on, such that a plurality of signals are being emitted.

Further and as discussed herein, in one embodiment, once the signal output emits a signal, the signal detector of an adjacent display screen detects the signal and determines a bit number that is either a 0 or a 1. For example and referring to FIGS. 1-3, consider the display screen 200 at the uppermost left corner, having the positional code of 0110. The first bit number 0 (and thus first number shown) of 0110 is associated with the bit 3, side 204d, the top side of display screen 200. The second bit number 1 (second from the left) of 0110 is associated with the bit 1, side 204b, the bottom side of display screen 200. The third bit number 1 (third from the left) of 0110 is associated with the bit 2, side 204c, the right side of display screen 200. The fourth and last bit number 0 of 0110 is associated with the bit 0, side 204a, the left side of display screen 200.

Referring again to FIG. 3, in one embodiment, the sensor detector positioned at each side of a display screen will detect a bit number 1 if there is a screen next to it whose corresponding signal output emits a signal. Alternatively, the sensor detector will declare a bit number of 0 if a display screen is not detected as being adjacent or if the signal output of an adjacent display screen is turned off. Thus, as can be seen, the display screen 200 with the positional code 0110 denotes a position that is in the top left corner of the array of coupled display screens.

Referring to the display screen with the positional code of 0011 in the top right corner of the array of coupled display screens 300, bit 3 corresponds to the number 0 and represents that there is not a display screen that is adjacent to the top side of the display window. Bit 2 corresponds to the number 0 and represents that there is not a display screen that is adjacent to the right side of the display screen. Bit 1 corresponds to the number 1 and represents that there is a display screen that is adjacent to the bottom side of the display screen. Bit 0 corresponds to the number 1 and represents that there is a display screen that is adjacent to the left side of the display screen.

Referring to the display screen with the positional code 1001 in the bottom right corner, bit 3 corresponds to the number 1 and represents that there is a display screen that is adjacent to the top side of the display window. Bit 2 corresponds to the number 0 and represents that there is not a display screen that is adjacent to the right side of the display screen. Bit 1 corresponds to the number 0 and represents that there is not a display screen that is adjacent to the bottom side of the display screen. Bit 0 corresponds to the number 1 and represents that there is a display screen that is adjacent to the left side of the display screen.

Referring to the display screen with the positional code 1100 in the bottom left corner, bit 3 corresponds to the number 1 and represents that there is a display screen that is adjacent to the top side of the display window. Bit 2 corresponds to the number 1 and represents that there is a display screen that is adjacent to the right side of the display screen. Bit 1 corresponds to the number 0 and represents that there is not a display screen that is adjacent to the bottom side of the display screen. Bit 0 corresponds to the number 0 and represents that there is not a display screen that is adjacent to the left side of the display screen.

Thus, in one embodiment, the positional codes detected by the signal detectors of each display screen serve to determine, within the immediate array of coupled display screens 300, whether or not a particular display screen is a corner display screen.

Some or all of the display screens of an array of coupled display screens sends positional code information to the computer. The computer stores this information to use later to determine the geometric positioning of the display screens within the array of coupled display screens. In one embodiment, the display screens are intelligent enough to determine its own position as a corner display screen, based on a determined positional code.

Figure 4:
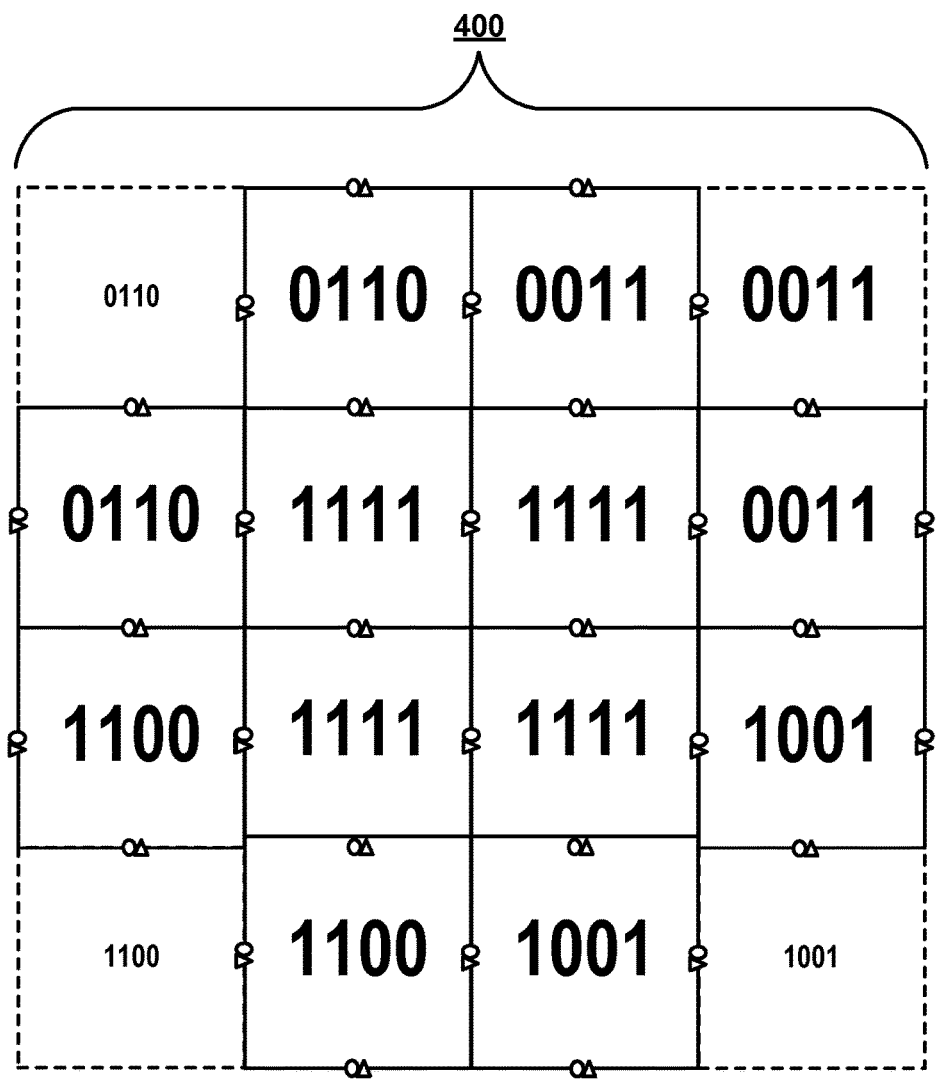
FIG. 4 is a block diagram of an example array of coupled display screens, according to one embodiment of the present technology.

Referring now to FIGS. 1-3 and to FIG. 4, a block diagram is shown of an example array of coupled display screens 400, according to one embodiment of the present technology. In one embodiment, the computer 100 sends instructions to the signal outputs of the four corner display screens of FIG. 3 to turn off emitting signal outputs. The signal outputs of the four corner display screens with positional codes 0110, 0011, 1001 and 1100 then turn themselves off. This is represented by the dotted lines. A new set of corner display screens remains, as can be seen in FIG. 4, but is yet to be discovered by the system 106.

For example, and with reference to the display screen with the positional code of 0110 on the top line, second column. It can be seen that bit 3 corresponds to the number 0 and represents that there is not a display screen that is adjacent to the top side of the display window. Bit 2 corresponds to the number 1 and represents that there is a display screen that is adjacent to the right side of the display screen. Bit 1 corresponds to the number 1 and represents that there is a display screen that is adjacent to the bottom side of the display screen. Bit 0 corresponds to the number 0 and represents that there is not a display screen that is adjacent to the left side of the display screen.

With reference to the display screen with the positional code of 0011 on the top line, third row, it can be seen that bit 3 corresponds to the number 0 and represents that there is not a display screen that is adjacent to the top side, of the display window. Bit 2 corresponds to the number 0 and represents that there is not a display screen that is adjacent to the right side of the display screen. Bit 1 corresponds to the number 1 and represents that there is a display screen that is adjacent to the bottom side of the display screen. Bit 0 corresponds to the number 1 and represents that there is a display screen that is adjacent to the left side of the display screen.

Thus, following the above description of the positional codes for display screens in FIG. 4, it can be seen that the corner display screens in FIG. 4 are now the display screens with the positional codes 0110, 0011, 0011, 1001, 1001, 1100, 1100 and 0110, moving clockwise from the display screen with the positional code 0110. These corner display screens send this positional information to the computer 100. The computer 100 stores this information, compares it to the already stored positional code information, if any, and further continues to determine the overall geometric positioning of the display screens relative to all the other display screens within the array of coupled display screens 300 of FIG. 3.

Figure 5:
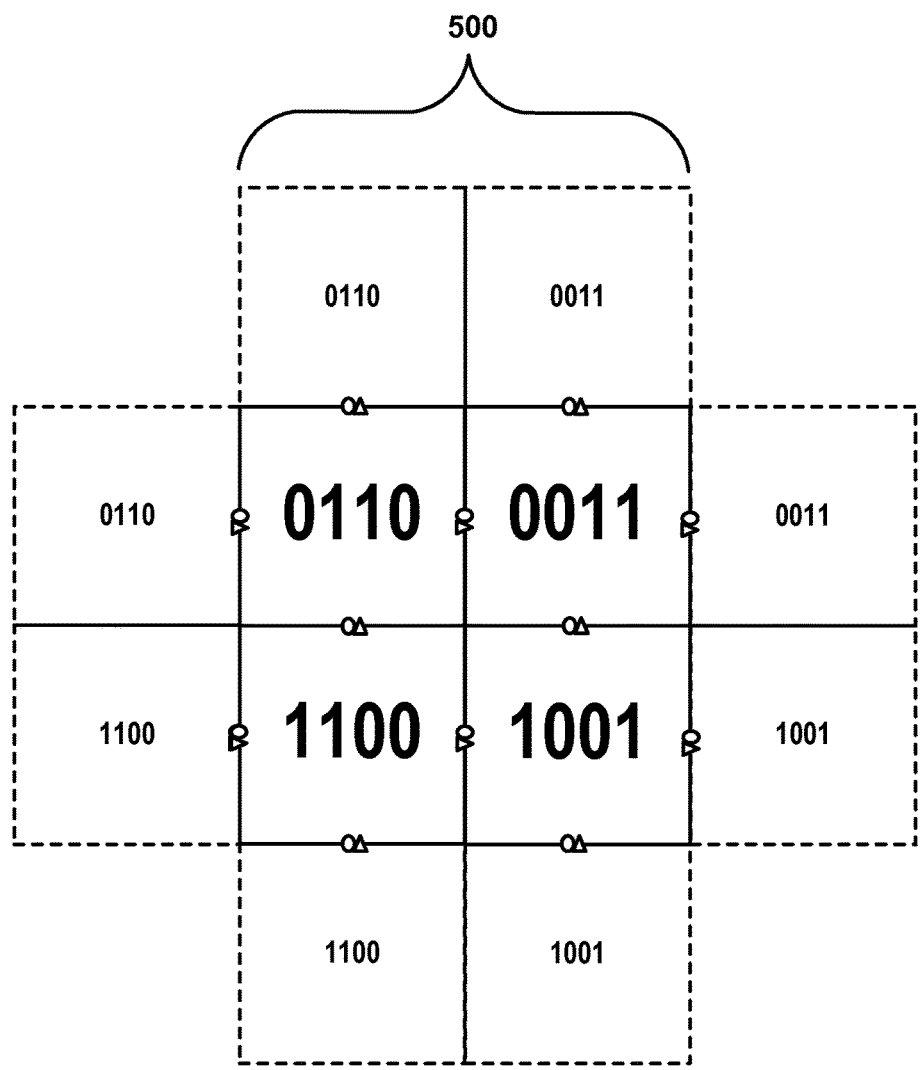
FIG. 5 is a block diagram of an example array of coupled display screens, according to one embodiment of the present technology.

In FIG. 5, a block diagram is shown of an example array of coupled display screens 500, according to one embodiment of the present technology. Referring now to FIGS. 1-5, in this block diagram, the computer 100 sends instructions to the eight corner display screens of FIG. 4, (clockwise from the top left, 0110, 0011, 0011, 1001, 1001, 1100, 1100 and 0110) to turn off their signal outputs, represented by the dotted lines. The signal outputs of the eight corner display screens with positional codes 0110, 0011, 0011, 1001, 1001, 1100, 1100 and 0110 (again, represented by the dotted lines) then turn themselves off. A new set of corner display screens remain, as can be seen in FIG. 5, but are yet to be discovered as corner display screens by the system 106.

For example, and with reference to the display screen with the positional code of 0110 in the first row, first column (excluding the columns and rows that are represented with dotted lines), it can be seen that bit 3 corresponds to the number 0 and represents that there is not a display screen that is adjacent to the top side of the display window. Bit 2 corresponds to the number 1 and represents that there is a display screen that is adjacent to the right side of the display screen. Bit 1 corresponds to the number 1 and represents that there is a display screen that is adjacent to the bottom side of the display screen. Bit 0 corresponds to the number 0 and represents that there is not a display screen that is adjacent to the left side of the display screen.

With reference to the display screen with the positional code of 0011 in the second row, first column (excluding the columns and rows that are represented with dotted lines), it can be seen that bit 3 corresponds to the number 0 and represents that there is not a display screen that is adjacent to the top side of the display window. Bit 2 corresponds to the number 0 and represents that there is not a display screen that is adjacent to the right side of the display screen. Bit 1 corresponds to the number 1 and represents that there is a display screen that is adjacent to the bottom side of the display screen. Bit 0 corresponds to the number 1 and represents that there is a display screen that is adjacent to the left side of the display screen.

For example, and with reference to the display screen with the positional code of 1001 in the second row, second column (excluding the columns and rows that are represented with dotted lines), it can be seen that bit 3 corresponds to the number 1 and represents that there is a display screen that is adjacent to the top side of the display window. Bit 2 corresponds to the number 0 and represents that there is not a display screen that is adjacent to the right side of the display screen. Bit 1 corresponds to the number 0 and represents that there is not a display screen that is adjacent to the bottom side of the display screen. Bit 0 corresponds to the number 1 and represents that there is a display screen that is adjacent to the left side of the display screen.

With reference to the display screen with the positional code of 1100 in the second row, first column (excluding the columns and rows that are represented with dotted lines), it can be seen that bit 3 corresponds to the number 1 and represents that there is a display screen that is adjacent to the top side of the display window. Bit 2 corresponds to the number 1 and represents that there is a display screen that is adjacent to the right side of the display screen. Bit 1 corresponds to the number 0 and represents that there is not a display screen that is adjacent to the bottom side of the display screen. Bit 0 corresponds to the number 0 and represents that there is not a display screen that is adjacent to the left side of the display screen.

Thus, it can be seen that the corner display screens in FIG. 5 are now the display screens with the positional codes 0110, 0011, 1001 and 1100. These corner display screens send this positional information to the computer 100. The computer 100 stores this information, compares it to the already stored positional code information, if any, and further continues to determine the overall geometric positioning of the display screens relative to all the other display screens within the array of coupled display screens 300 of FIG. 3.

Thus, in one embodiment, the positional code receiver 102 of the computer 100 receives the plurality of positional codes from the plurality of signal detectors of the plurality of active corner display screens. The term, "active", is used in the context of an active corner display, to describe a corner display whose signal output is still on and emitting signals, as opposed to being turned off and not emitting signals. A signal detector of the active corner display screen determines that it is part of a corner display screen and sends its positional code to the positional code receiver 102. In one embodiment, all of the signal detectors send determined positional codes to the computer 100. In another embodiment, less than all of the signal detectors of the plurality of signal detectors of the array of coupled display screens send positional codes to the computer 100.

Further, in one embodiment, the geometric position determiner 104 determines a geometric position of each of the plurality of active corner display screens within the array of coupled display screens based on the plurality of positional codes being received at the positional code receiver 102.

In one embodiment, the array of coupled display screens, such as those shown in FIG. 1, are interconnected such that a single flat surface is created. In one embodiment, the array of coupled display screens are interconnected via support elements 110, as will be described herein. In another embodiment, each display screen of the array of coupled display screens includes an angle between each other in a horizontal direction such that the array of coupled display screens is a curved surface.

In another embodiment, a support element 110 connects a display screen, such as display screen 108a to another display screen, such as display screen 108b. In one embodiment, this support element 110 is modular. In another embodiment, this support element 110 is expandable, thereby enabling a height adjustment of the array of coupled display screens. In one embodiment, the system includes wheels. This allows for easy movement of the array of connected display screens from one place to another. In another embodiment, the system includes at least one camera 112 coupled with the at least one display screen of the array of coupled display screens. Furthermore, system 106 shows a base 116 coupled with the array of coupled display screens. It should be appreciated that the base 116 may be of any configuration that supports the interconnected array of coupled display screens. Yet in another embodiment, the system includes at least one stereo speaker 114a and 114b. Thus, it can be seen that the system may have an assortment of various accessories coupled therewith.

Further, in one embodiment and as described herein, the signal outputs and signal detectors may communicate with each other wirelessly. In another embodiment, a cable connects the signal outputs and signal detectors to a power supply. In yet another embodiment, the signal outputs and the signal detectors have an onboard power supply. In yet another embodiment, each of the array of coupled display screens 108 is coupled with its own computer, such as, but instead of, the centralized computer 100 described herein. By providing each display screen with its own computer that performs the functions of the computer 100 described herein, a centralized computer 100 may be eliminated. The separate computers share data and assign tasks amongst themselves, given the appropriate communication protocol.

Thus, embodiments of the present technology provide method of presenting a large single display screen that is made up of modular display screens. The signal detectors of the individual display screens are intelligent and sense their own position within the array of coupled display screens. The signal detectors of the individual display screens then communicate this position to a computer. The computer then determines the overall geometric positioning of the display screens. By providing modular display screens with wireless intelligent sensors, embodiments of the present technology avoid the problem of projectors and display screens having fixed positions and the problems associated with complicated installation and wiring.

Operation

FIG. 6 is a flow diagram of a method 600 for determining a position of at least one display screen within an array of coupled display screens. In one embodiment, method 600 is embodied in instructions, stored on a non-transitory computer-readable storage medium, which when executed by a computer system (see 800 of FIG. 8), cause the computer system to perform the method 600 for determining a position of at least one display screen within an array of coupled display screens. It should be noted that instead of a single computer 100, as is shown in FIG. 1, various embodiments may include a plurality of computers, with the features of computer 100 described herein, coupled with the array of coupled display screens 108. This plurality of computers communicates with each other, thereby sharing data and assigning tasks without the need for a central computer. The method 300 is described below with reference to FIGS. 1-5.

At 602, in one embodiment and as described herein, the method 600 includes instructions for detecting a signal emitted from an adjacent display screen, the detecting performed by a sensor coupled with a side of a plurality of sides of a display screen, wherein the adjacent screen is adjacent to the side. It should be appreciated that while one signal is shown to be detected in step 602, this step may be performed repeatedly to arrive at many different signals being detected from a plurality of adjacent display screens.

Further, in one embodiment and as described herein, the method 600 includes instructions for the detecting of 602, in which the detecting (602) is performed by a signal detector coupled with a side of a display screen, wherein the signal detector communicates through a single cable coupled with the array of coupled display screens.

In one embodiment and as described herein, the method 600 includes instructions for the detecting of 602, in which the detecting (602) is performed by a signal detector coupled with a side of a display screen, wherein the signal detector communicates wirelessly with other signal detectors coupled with the array of coupled display screens.

At 604, in one embodiment and as described herein, the method 600 includes instructions for determining a positional code number based on the detecting at 602. The positional code number includes a bit number corresponding to a detection of the signal emitted from the adjacent display screen. It should be appreciated that while one positional code number is determined at step 604, this step may be performed repeatedly to arrive at many positional code numbers being detected.

Further, in one embodiment and as described herein, if a signal is detected at the side of the display screen, wherein the signal is emitted from the adjacent display screen, then a positional code of a bit number 1 is determined. However, if a signal is not detected at the side of the display screen, then a positional code of a bit number 0 is determined.

At 606, in one embodiment and as described herein, the method 600 includes instructions for sending the positional code number to a receiver of positional codes. In one embodiment, the receiver of positional codes is the positional code receiver 102.

In one embodiment and as described herein, the method 600 includes instructions for performing the detecting of 602 and the determining of 604 after signals at corner display screens of the array of coupled display screens are turned on. In one embodiment, the instructions include repeating the detecting of 602 and the determining of 604 after signals at corner display screens of the array of coupled display screens are turned off.

FIG. 7 is a flow diagram of a method 700. In one embodiment, method 700 is embodied in instructions, stored on a non-transitory computer-readable storage medium, which when executed by a computer system (see 800 of FIG. 8), cause the computer system to perform the method 700 for determining a position of at least one display screen within an array of coupled display screens. The method 700 is described below with reference to FIGS. 1-5.

At 702, in one embodiment and as described herein, the method 700 includes instructions for receiving a plurality of positional codes from an active corner display screen within an array of display screens, wherein each positional code of the plurality of positional codes includes a bit number corresponding to a detection of a signal emitted from an adjacent display screen.

At 704, in one embodiment and as described herein, the method 700 includes instructions for determining a geometric position of the active corner display screen within the array of coupled display screens based on the receiving at 702 of the plurality of positional codes. Further, in one embodiment, the signal output of the display screen is instructed to become active by emitting a signal from a side of a plurality of sides of the display screen. While a signal output is instructed to emit a signal, it should be appreciated that this step may be performed repeatedly such that a display screen may be instructed to emit a plurality of signals from a plurality of its sides, a plurality of display screens may be instructed to emit a single signal, and a plurality of display screens may be instructed to emit a plurality of signals.

In one embodiment, a plurality of positional codes are received. As described herein, in one embodiment, the positional codes include at least one of a bit number 1 and a bit number 0. The bit number 1 corresponds to a signal that is detected at a side of the display screen. The bit number 1 corresponds to a signal that is not detected at a side of the display screen. Of note, a positional code may be referred to as a single number within a group of numbers (e.g., a positional code number) or a group of numbers representing the positional code for a display screen.

Current systems for creating display screens into a large single surface are heavy and cumbersome. Embodiments of the present technology provide a lightweight, modular system with multiple connected intelligent display screens.

Example Computer System Environment

Figure 8:
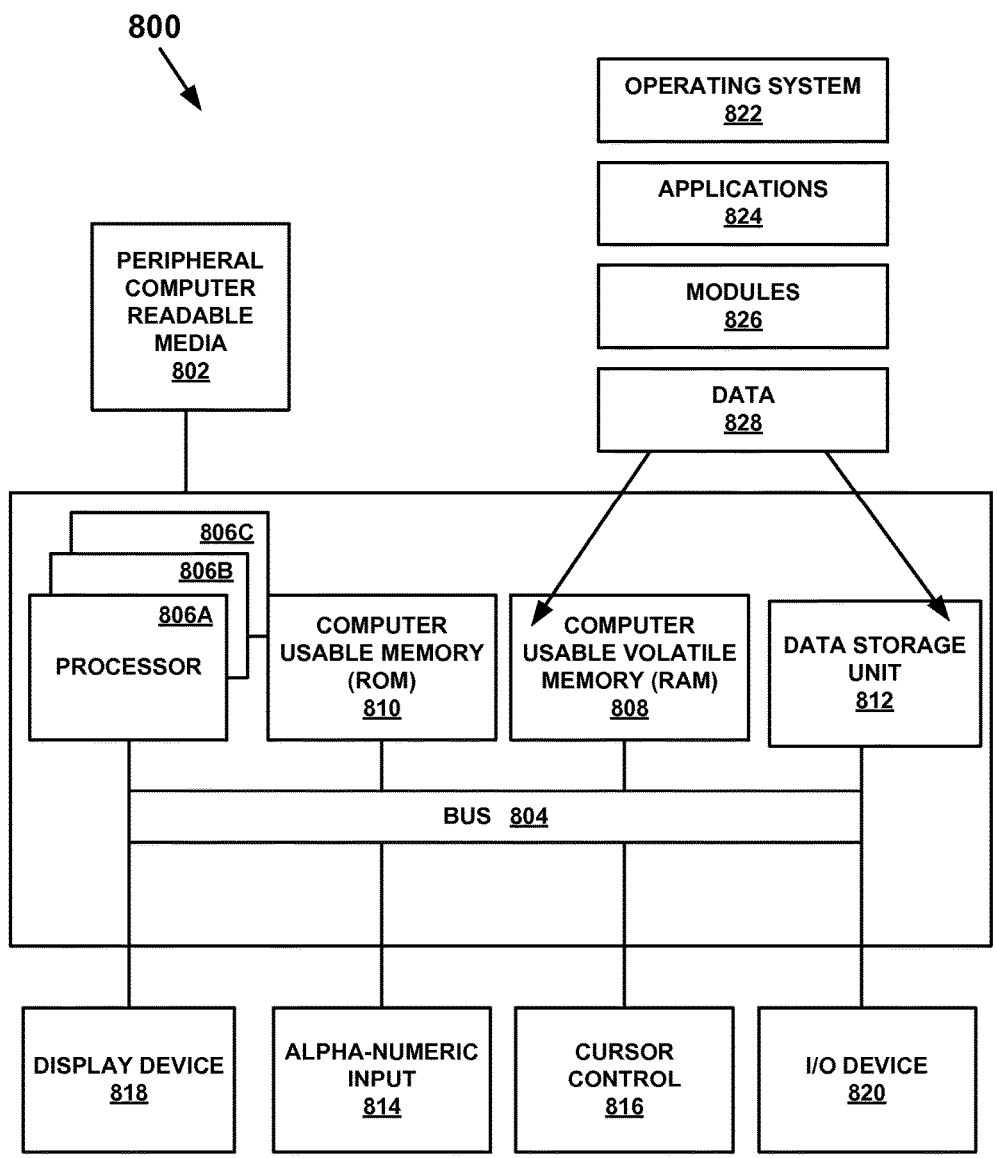
FIG. 8 is a diagram of an example computer system used for determining a position of at least one display screen within an array of coupled display screens, according to one embodiment of the present technology.

With reference now to FIG. 8, portions of the technology for determining a position of at least one display screen within an array of coupled display screens are composed of computer-readable and computer-executable instructions that reside, for example, in computer-readable storage media of a computer system. That is, FIG. 8 illustrates one example of a type of computer that can be used to implement embodiments, which are discussed below, of the present technology.

FIG. 8 illustrates an example computer system 800 used in accordance with embodiments of the present technology. It is appreciated that system 800 of FIG. 8 is an example only and that the present technology can operate on or within a number of different computer systems including general purpose networked computer systems, embedded computer systems, routers, switches, server devices, user devices, various intermediate devices/artifacts, stand alone computer systems, and the like. As shown in FIG. 8, computer system 800 of FIG. 8 is well adapted to having peripheral computer readable media 802 such as, for example, a floppy disk, a compact disc, and the like coupled thereto.

System 800 of FIG. 8 includes an address/data bus 804 for communicating information, and a processor 806A coupled to bus 804 for processing information and instructions. As depicted in FIG. 8, system 800 is also well suited to a multi-processor environment in which a plurality of processors 806A, 806B, and 806C are present. Conversely, system 800 is also well suited to having a single processor such as, for example, processor 806A. Processors 806A, 806B, and 806C may be any of various types of microprocessors. System 800 also includes data storage features such as a computer usable volatile memory 808, e.g. random access memory (RAM), coupled to bus 804 for storing information and instructions for processors 806A, 806B, and 806C.

System 800 also includes computer usable non-volatile memory 810, e.g. read only memory (ROM), coupled to bus 804 for storing static information and instructions for processors 806A, 806B, and 806C. Also present in system 800 is a data storage unit 812 (e.g., a magnetic or optical disk and disk drive) coupled to bus 804 for storing information and instructions. System 800 also includes an optional alphanumeric input device 814 including alphanumeric and function keys coupled to bus 804 for communicating information and command selections to processor 806A or processors 806A, 806B, and 806C. System 800 also includes an optional cursor control device 816 coupled to bus 804 for communicating user input information and command selections to processor 806A or processors 806A, 806B, and 806C. System 800 of the present embodiment also includes an optional display device 818 coupled to bus 804 for displaying information.

Referring still to FIG. 8, optional display device 818 of FIG. 8 may be a liquid crystal device, cathode ray tube, plasma display device or other display device suitable for creating graphic images and alphanumeric characters recognizable to a user. Optional cursor control device 816 allows the computer user to dynamically signal the movement of a visible symbol (cursor) on a display screen of display device 818. Many implementations of cursor control device 816 are known in the art including a trackball, mouse, touch pad, joystick or special keys on alpha-numeric input device 814 capable of signaling movement of a given direction or manner of displacement. Alternatively, it will be appreciated that a cursor can be directed and/or activated via input from alpha-numeric input device 814 using special keys and key sequence commands.

System 800 is also well suited to having a cursor directed by other means such as, for example, voice commands. System 800 also includes an I/O device 820 for coupling system 800 with external entities. For example, in one embodiment, I/O device 820 is a modem for enabling wired or wireless communications between system 800 and an external network such as, but not limited to, the Internet. A more detailed discussion of the present technology is found below.

Referring still to FIG. 8, various other components are depicted for system 800. Specifically, when present, an operating system 822, applications 824, modules 826, and data 828 are shown as typically residing in one or some combination of computer usable volatile memory 808, e.g. random access memory (RAM), and data storage unit 812. However, it is appreciated that in some embodiments, operating system 822 may be stored in other locations such as on a network or on a flash drive; and that further, operating system 822 may be accessed from a remote location via, for example, a coupling to the internet. In one embodiment, the present technology, for example, is stored as an application 824 or module 826 in memory locations within RAM 808 and memory areas within data storage unit 812. The present technology may be applied to one or more elements of described system 800. For example, a method for identifying a device associated with a transfer of content may be applied to operating system 822, applications 824, modules 826, and/or data 828.

The computing system 800 is only one example of a suitable computing environment and is not intended to suggest any limitation as to the scope of use or functionality of the present technology. Neither should the computing environment 800 be interpreted as having any dependency or requirement relating to any one or combination of components illustrated in the example computing system 800.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What we claim is:

1. A non-transitory computer-readable storage medium comprising instructions stored thereon which, when executed by a computer system, cause said computer system to perform a method for determining a position of at least one display screen within an array of coupled display screens, said method comprising:
   detecting signals concurrently emitted from each adjacent side of an adjacent display screen, said detecting concurrently performed by sensors adjacent said each adjacent side of said adjacent display screen; and
   determining a positional code number based on said detecting, said positional code number comprising a bit number corresponding to a detection of said signal emitted from said adjacent display screen.

2. The non-transitory computer-readable storage medium of claim 1, wherein said method further comprises instructions for:
   sending said positional code number to a receiver of positional codes.

3. The non-transitory computer-readable storage medium of claim 1, wherein said method further comprises instructions for:
   performing said detecting and said determining after signals at corner display screens of said array of coupled display screens are turned on.

4. The non-transitory computer-readable storage medium of claim 1, wherein said method further comprises instructions for:
   repeating said detecting and said determining after signals at corner display screens of said array of coupled display screens are turned off.

5. The non-transitory computer-readable storage medium of claim 1, wherein said determining a positional code based on said detecting, said positional code comprising a bit number corresponding to a detection of said signals concurrently emitted from each adjacent side of an adjacent display screen comprises instructions for:
   if a signal is detected at said side of said display screen, wherein said signal is emitted from said adjacent display screen, then determining a positional code of a bit number 1; and
   if a signal is not detected at said side of said display screen, then determining a positional code of a bit number 0.

6. The non-transitory computer-readable storage medium of claim 1, wherein said detecting signals concurrently emitted from each adjacent side of an adjacent display screen, further comprises instructions for:
   detecting a signal emitted from a signal output of an adjacent display screen, wherein said detecting is performed by a signal detector coupled with a side of a display screen, wherein said signal detector communicates through a single cable coupled with said array of coupled display screens.

7. The non-transitory computer-readable storage medium of claim 1, wherein said detecting signals concurrently emitted from each adjacent side of an adjacent display screen, further comprises instructions for:
   detecting a signal emitted from a signal output of an adjacent display screen, wherein said detecting is performed by a signal detector coupled with a side of a display screen, wherein said signal detector communicates wirelessly with other signal detectors coupled with said array of coupled display screens.

* * * * *